US007230942B2

(12) United States Patent
Laroia et al.

(10) Patent No.: US 7,230,942 B2
(45) Date of Patent: Jun. 12, 2007

(54) METHOD OF DOWNLINK RESOURCE ALLOCATION IN A SECTORIZED ENVIRONMENT

(75) Inventors: Rajiv Laroia, Basking Ridge, NJ (US); Junyi Li, Bedminster, NJ (US)

(73) Assignee: Qualcomm, Incorporated, San Diego, CA (US)

( * ) Notice: Subject to any disclaimer, the term of this patent is extended or adjusted under 35 U.S.C. 154(b) by 830 days.

(21) Appl. No.: 10/678,467

(22) Filed: Oct. 3, 2003

(65) Prior Publication Data

US 2005/0073973 A1   Apr. 7, 2005

(51) Int. Cl.
*H04B 7/208* (2006.01)
*H04Q 7/20* (2006.01)
(52) U.S. Cl. ...................... 370/344; 455/447
(58) Field of Classification Search ................ 370/328, 370/344; 375/132; 455/447, 449, 450, 63.1, 455/63.3
See application file for complete search history.

(56) References Cited

U.S. PATENT DOCUMENTS

| | | | |
|---|---|---|---|
| 5,933,421 A | 8/1999 | Alamouti et al. | |
| 6,493,331 B1 | 12/2002 | Walton et al. | |
| 6,751,444 B1 | 6/2004 | Meiyappan | |
| 2004/0085892 A1* | 5/2004 | Walton et al. | ............... 370/208 |
| 2004/0095902 A1* | 5/2004 | Laroia et al. | ............... 370/328 |
| 2004/0166886 A1* | 8/2004 | Laroia et al. | ............... 455/522 |
| 2004/0166887 A1* | 8/2004 | Laroia et al. | ............... 455/522 |
| 2005/0036441 A1* | 2/2005 | Laroia et al. | ............... 370/203 |

OTHER PUBLICATIONS

PCT International Search Report for International Application No. PCT/US04/02515, filed on Jan. 30, 2004.

* cited by examiner

*Primary Examiner*—Nguyen T. Vo
(74) *Attorney, Agent, or Firm*—Straub & Pokotylo; Michael P. Straub

(57) ABSTRACT

Methods and apparatus for communicating different size coded blocks of information in a wireless sectorized communications cell are described. Information may be categorized and formed into large, medium, and small coded blocks which may include error correction code bits based on the number of bits representing the information, time criticality of the information, and tolerable level of interference. Channels with full tone overlap between adjacent sectors, channels with no tone overlap between adjacent sectors, and channels with partial tone overlap between adjacent sectors are used for different size blocks. Some tones corresponding to a channel with less than full tone overlap are left unused in an adjacent sector thereby achieving less than full transmission tone overlap. Large transmission blocks are transmitted using full tone overlap channels; medium transmission blocks are transmitted using partial tone overlap channels; small transmission blocks are transmitted without using transmission tone overlap in adjacent sectors.

29 Claims, 6 Drawing Sheets

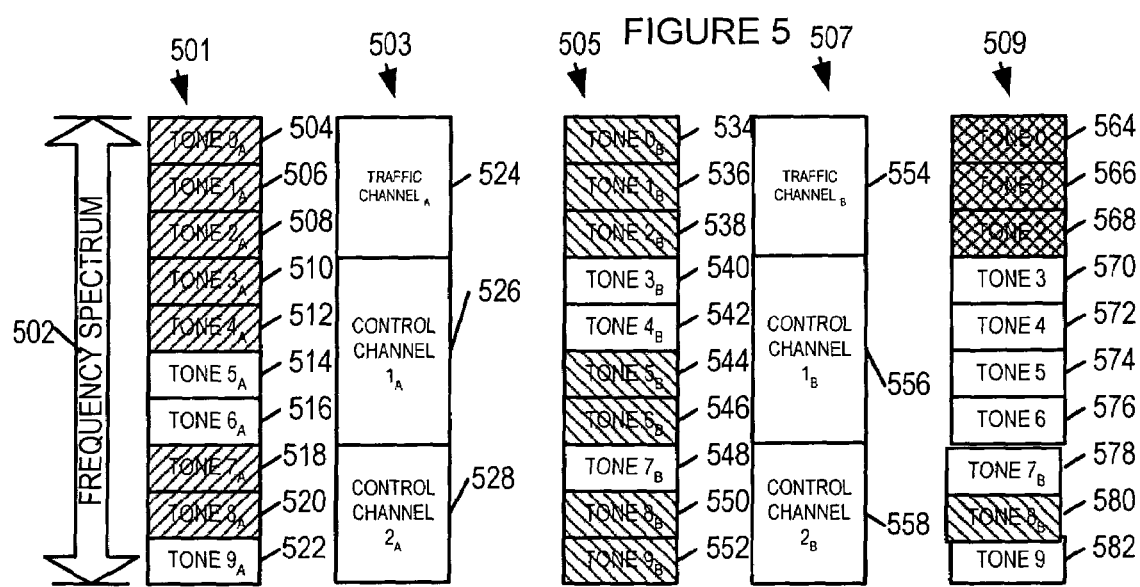
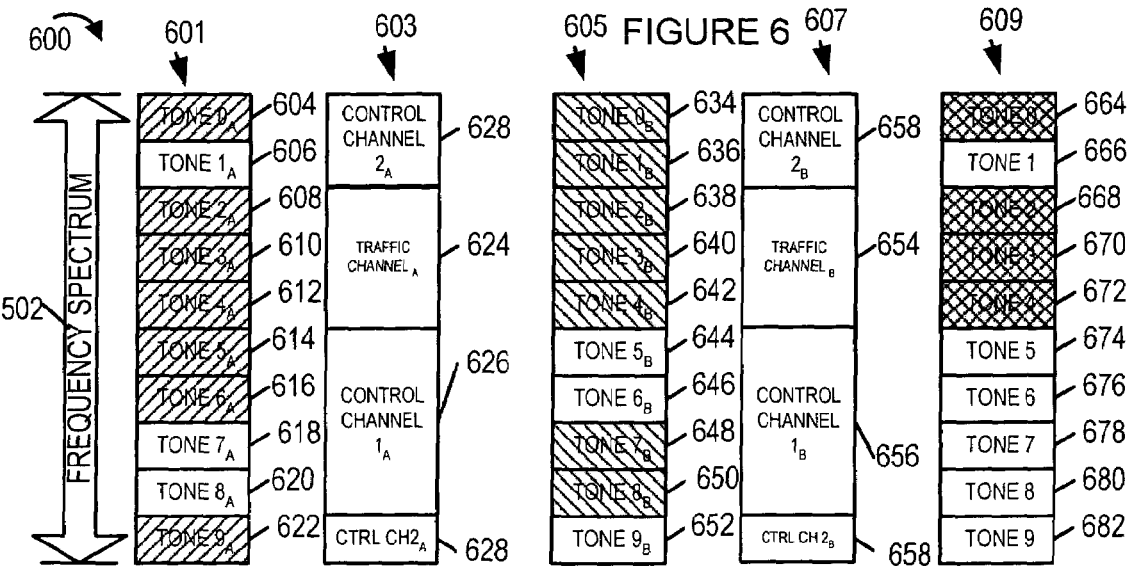

_US 7,230,942 B2_

METHOD OF DOWNLINK RESOURCE ALLOCATION IN A SECTORIZED ENVIRONMENT

FIELD OF THE INVENTION

The present invention relates to communications systems and, more particularly, to methods and apparatus for allocating resources, e.g., bandwidth over time in a sectorized cellular communications network.

BACKGROUND

In a cellular wireless system, a service area is divided into a number of coverage zones generally referred to as cells. Each cell may be further subdivided into a number of sectors. Base stations may transmit information on downlink channels to wireless terminals in each of the sectors of the base station's cell simultaneously, using different frequencies in different sectors or, in some cases, reusing the same frequency bandwidth in each of the sectors. Wireless terminals may include a wide range of mobile devices including, e.g., cell phones and other mobile transmitters such as personal data assistants with wireless modems.

A problem with sectorized cellular communications systems is that transmissions by the base station into a first sector of a cell intended for a first wireless terminal may interfere with transmissions from the base station into a second sector, intended for a second wireless terminal. In the case of sectors of a cell, due to transmitter proximity, this interference can be significantly greater than in the case of a neighboring cell transmission, in which case the transmitter and the antenna of a neighboring base station is located in a different cell.

Inter-sector interference is particularly problematic for wireless terminals located in sector boundary regions, e.g., regions where the received signal strength levels from both sector base station transmissions, as measured at the wireless terminal, are nearly equal. Inter-sector interference may be reduced by restricting transmissions from being on the same bandwidth in an adjacent sector resulting in increased transmission reliability; however, this has the negative effect of reducing overall system capacity. Different types of information are often coded differently, e.g., using different block sizes and/or different amounts of error correction codes and, in some cases no error correction codes at all. Generally, where some form of signal coding is used, the larger the block size used in coding the greater the protection against burst errors where one or a few consecutive bits are lost, e.g., at one or more different locations in the coded block. Burst errors are common in the case of wireless systems and may be the result of unpredictable impulse noise occurring on one or more tones. Unfortunately, large block sizes are not well suited for all types of data. In the case of time critical control information for example, it may not be practical to code the control information in large blocks which could take a relatively long time to communicate over a wireless link before they could be decoded. Thus, small block sizes are often used for time critical data particularly where the data unit to be transmitted can be represented in relatively few bits. For example some control signals can be transmitted using a single or a few bits with these signals frequently being transmitted in relatively small blocks. In the case of transmitted blocks including multiple bits, e.g., 2 or 3 bits, repetition coding may be used, e.g., the data bit may be repeated. However, given the small number of bits, the information in a small block is still particularly prone to loss due to signal interference.

Some control signals are normally represented using several bits with such signals frequently being encoded as medium or intermediate size blocks. Such blocks normally include error correction coding bits or some other form of error protection. While error correction is supported, the medium size coding block may be more prone to errors due to bursty signal interference than blocks of larger size where error correction coding and data resequencing over the larger block size can provide better protection against short term interference bursts than may be possible in a medium sized coding block.

Information and/or control signals which are not particularly time critical may be grouped together to form larger blocks of data which are coded and transmitted as a unit, e.g., a large coded block. Large coded blocks are frequently used for non-time critical data and/or data that requires a large number of bits to be useful. Larger code blocks may include, e.g., hundreds or even many thousands of bits which are treated as a single block for error correction coding purposes.

From the above discussion, it can be appreciated that different types of information and/or different size blocks of data transmitted from the base station to a wireless terminal, can tolerate different levels of interference before impacting system operation and the reliability of the information being communicated.

In order to use bandwidth efficiently, it is generally desirable to reuse as much of the frequency spectrum in each sector as possible. Unfortunately, in the case of a sectorized cell, the greater the amount of frequency reused in each of the sectors the greater the risk of signal interference and the loss of data. As noted above, different types of data and different coded block sizes can often tolerate different amounts of interference before becoming unusable. Thus, while avoiding use of the same tones in adjacent sectors minimizes signal interference it may also lead to an unacceptable loss of bandwidth if applied to all coded blocks to be transmitted in a cell. Similarly, transmitting information on the same tone in each sector at the same time may result in an unacceptable error rate particularly with regard to coded blocks which are small in size, e.g., one or a few bits.

In view of the above discussion, it becomes apparent that there is a need for methods and apparatus that exploit the different levels of tolerable interference for different types of information, and thus provide multiple levels of trade offs between bandwidth and transmission reliability.

BRIEF DESCRIPTION OF THE FIGURES

FIG. 5 illustrate examples of the tone allocations to different types of channels in two adjacent sectors in accordance with the invention.

FIG. 6 illustrates that the tones assigned to the channels shown in FIG. 5 may hop over time, in accordance with the present invention.

SUMMARY OF INVENTION

Figure 1:
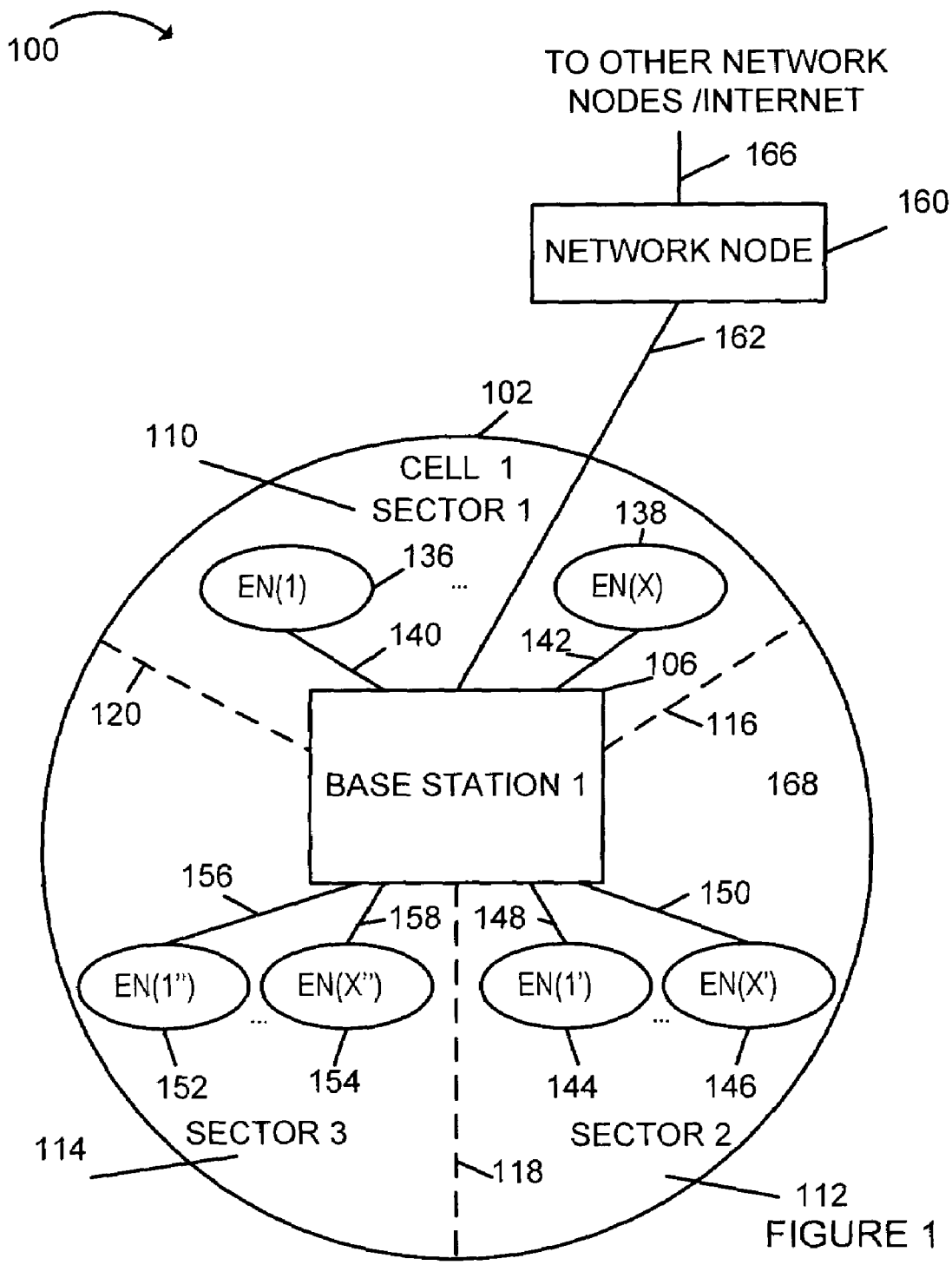
FIG. 1 illustrates an exemplary sectorized communication system implemented in accordance with the invention.

The present invention is directed to communications methods and apparatus and, more particularly, to methods and apparatus for communicating different size blocks of coded information in a multi-tone multi-sector, multi-cell communications system. The system may be, for example, a frequency division multiplexed (FDM) system. Various embodiments are implemented as orthogonal frequency division multiplexed (OFDM) systems. In some embodiments the systems may use the same set of tones in each of the sectors of the system simultaneously.

The invention will be explained in the context of using at least three different coded block sizes, e.g., a first size block, a second size block, and a third size block, but more sizes may be used. In an embodiment, the first size blocks of information are smaller than the second size blocks of information, and the second size blocks of information are smaller than the third size blocks of information.

In various embodiments the first size blocks are a single or few bits in length. In the case of a block with one data bit, one or more repetition coding bits can be included in the coded block to generate a small block where the single information bit is repeated. Due to the limited block size the information in the single bit block is particularly prone to loss due to interference. In such embodiments second size blocks may include, e.g., tens of bits. Third size blocks may include hundreds or even thousands of bits.

In some embodiments, the first size blocks of information are used to transmit wireless terminal power control information which is relatively time critical and takes very few bits, e.g., less than 10 bits and in many cases 3 or less bits, to communicate. The second size blocks of information are sometimes used to communicate other types of control information, e.g., timing control information, which may still be somewhat time critical but takes more than a few bits, e.g., 3–20 bits in various exemplary embodiments, to communicate. The third size blocks of information are frequently used to convey user data, e.g., text, voice, and/or information files. Usually, such information is not easily represented in a very small number of bits and/or tends to be less time critical than various control signals. The blocks of the third size normally include more than 20 bits and, in many cases include more than a 100 and even sometimes many thousands of bits in length.

In accordance with the present invention, coded blocks to be transmitted are classified according to size. Different sets of tones are allocated for purposes of transmitting blocks of different sizes. The same tones are allocated in each sector of the cell, during the same symbol transmission time period, for purposes of transmitting blocks of the same size. In the case where blocks of the first, second and third sizes are transmitted during the same symbol time period, at least a first set of tones will be allocated for transmitting blocks of the first size, a second set of tones will be allocated for transmitting blocks of the second size, and a third set of tones will be allocated for transmitting blocks of the third size. In any one sector, the full set of first and second allocated tones may not be used at any given time. Each set of tones allocated to transmitting blocks of a particular size may correspond to a communications channel which is supported in each of the sectors. Multiple tone sets may be used for transmitting blocks of a particular size. In such a case multiple communications channels are dedicated to transmitting blocks of that particular single size. In such a case, the tone reuse methods of the present invention may be applied on a per channel basis, e.g., with each tone set for a given block size being reused in each of the sectors in the same manner as the other tone sets dedicated to transmitting blocks of the same size.

Taking into consideration the fact that the information in smaller size blocks tends to be more prone to transmission loss due to errors resulting from signal interference than larger size blocks, steps are taken to minimize transmission interference between adjacent sectors that will affect small blocks, and particularly, one bit control signal blocks. In particular, transmission in adjacent sectors is controlled such that when blocks of the first size are transmitted using tones in a first sector, the tones used to transmit the first size block in the first sector go unused in the second sector which is adjacent the first sector.

With regard to blocks of the second size, it is appreciated that a higher level of errors tends to be acceptable and may be tolerated without the loss of the information than in the case of the first, e.g., small, size blocks. However, second size blocks may encounter an unacceptable level of errors where the full set of tones used in the first sector to transmit second size blocks are used at the same time to transmit coded blocks in the second sector. Accordingly, the present invention controls transmitters in adjacent sectors to implement partial frequency reuse at a given time with regard to frequencies used to transmit blocks of the second size. In one embodiment, a second set of tones is used to transmit blocks of a second size during a particular transmission time period in each of the first and second sectors. A first subset of one or more tones from the second set of tones is used to transmit information at the same time in each of the first and second sectors. A second subset of tones from the second set of tones is used to transmit information in the first sector but go unused in the second sector. In addition, in some embodiments, a third subset of tones from the second set of tones is used to transmit information in the second sector but go unused in the first sector. Thus, in the case of blocks of the second size, there is partial but not full overlap in terms of tone utilization in adjacent sectors with some tones used for transmitting blocks of the second size normally going unused in one or each sector of the cell.

In the case of transmission blocks of the third size, a third set of tones is used to transmit the blocks of the third size in each of the sectors. The tones in the third set are fully reused in each sector with each sector transmitting information corresponding to blocks of the third size on each of the tones in the third set, e.g., at the same time. Thus, full frequency reuse is achieved in the sectors with regard to tones used to transmit the relatively large blocks of the third size.

Over time, tones may be hopped. However, the tone sets allocated for communicating blocks of different sizes will be the same in adjacent sectors during each transmission time period, e.g., symbol time period. Thus, the frequency reuse scheme of the present invention remains relatively straightforward to implement even in the case of frequency hopping.

In accordance with the invention, different types of communications channels may be structured, to convey the different size blocks of information.

As discussed above, blocks of different sizes are assigned to different communications channels implemented in accordance with the invention. A first type of communication channel used for conveying first size (small) blocks of information may be referred to as a communication channel with non-overlapping tones since, in a given sector, the tones used to transmit signals will not overlap the utilized tones in an adjacent sector since the tones in the adjacent sector are allocated to the first channel but go unused.

A second type of communication channel used for conveying second size (intermediate) blocks of information may be referred to as a channel with partial overlap of tones. This is because some of the utilized tones allocated to the second type of communications channel will be used in each of the adjacent sectors to transmit information while other tones allocated to the second type of communications channel will go unused in each of the adjacent sectors. Thus there is a partial overlap in tones used to transmit blocks of the second size in adjacent sectors.

A third type of communications channel used for conveying third size (large) blocks of information may be referred to as a communications channel with full tone overlap since tones used to transmit information on the third channel are used in adjacent sectors resulting in full or nearly full tone reuse.

The first type of communication channel is used as a wireless terminal power control command downlink channel in some embodiments. The second type of communications channel is used, in some embodiments, as a downlink timing control channel. While the third type of communications channel is often used as a downlink traffic (user data) channel used to communicate text, voice and/or other user related application data or information.

First, second, and third size transmission blocks of information for each sector may be transmitted simultaneously on communications channels of the first, second and third types, respectively. As discussed above, the tones assigned to a communications channel may hop over time, where the hopping is synchronized between the sectors of the cell.

In some embodiments, information types, e.g., wireless terminal power control, other control information, and user data may be classified according to coding block size and associated with specific types of channels, e.g., non-overlapping tone channels, partial overlapping tone channels, and fully overlapping tone channels. Such classification information can be stored in the base station and/or wireless terminals so that classifications need not be performed on a continuous basis, and the base station and wireless terminals can use that information to implement the methods of the present invention and assign data to channels as may be appropriate.

In other embodiments, the classifications of types of information and types of channels may be flexible and may be changed dynamically during operation, e.g., to adjust to changing conditions such as system overall loading, user priority, user required data rate, allowable user bit error rate, and the nature of the data and information transmitted.

Although the invention has been described in this application in the context of exemplary downlink data, information, communication channels, and transmissions, the invention may also be used in part or in its entirety with respect to the uplink in some wireless communications systems. The apparatus and methods of the present invention may be implemented using hardware, software or a combination of hardware and software.

Numerous additional features, benefits and details of the methods and apparatus of the present invention are described in the detailed description which follows.

DETAILED DESCRIPTION OF INVENTION

FIG. 1 shows an exemplary communication system 100 implemented in accordance with the present invention which includes a plurality of cells, such as cell 1 102 which is shown. Each cell 102 of exemplary system 100 includes three sectors. Cells with two sectors (N=2) and cells with more than 3 sectors (N>3) are also possible in accordance with the invention. Cell 102 includes a first sector, sector 1 110, a second sector, sector 2 112, and a third sector, sector 3 114. Each sector 110, 112, 114 has two sector boundary regions; each sector boundary region is shared between two adjacent sectors. Dashed line 116 represents a sector boundary region between sector 1 110 and sector 2 112; dashed line 118 represents a sector boundary region between sector 2 112 and sector 3 114; dashed line 120 represents a sector boundary region between sector 3 114 and sector 1 110. Cell 1 102 includes a base station (BS), base station 1 106, and a plurality of wireless terminals, e.g., end nodes (ENs), in each sector 110, 112, 114. Sector 1 110 includes EN(1) 136 and EN(X) 138 coupled to BS 106 via wireless links 140, 142, respectively; sector 2 112 includes EN(1') 144 and EN(X') 146 coupled to BS 106 via wireless links 148, 150, respectively; sector 3 114 includes EN(1") 152 and EN(X") 154 coupled to BS 106 via wireless links 156, 158, respectively. System 100 also includes a network node 160 which is coupled to BS1 106 via network link 162. Network node 160 is also coupled to other network nodes, e.g., other base stations, AAA server nodes, intermediate nodes, routers, etc. and the Internet via network link 166. Network links 162, 166 may be, e.g., fiber optic cables. Each end node, e.g. EN(1) 136, may be a wireless terminal including a transmitter as well as a receiver. The wireless terminals, e.g., EN(1) 136, may move through system 100 and may communicate via wireless links with the base station in the cell in which the EN is currently located. The wireless terminals, (WTs), e.g. EN(1) 136, may communicate with peer nodes, e.g., other WTs in system 100 or outside system 100 via a base station, e.g. BS 106, and/or network node 160. WTs, e.g., EN(1) 136 may be mobile communications devices such as cell phones, personal data assistants with wireless modems, etc.

Figure 2:
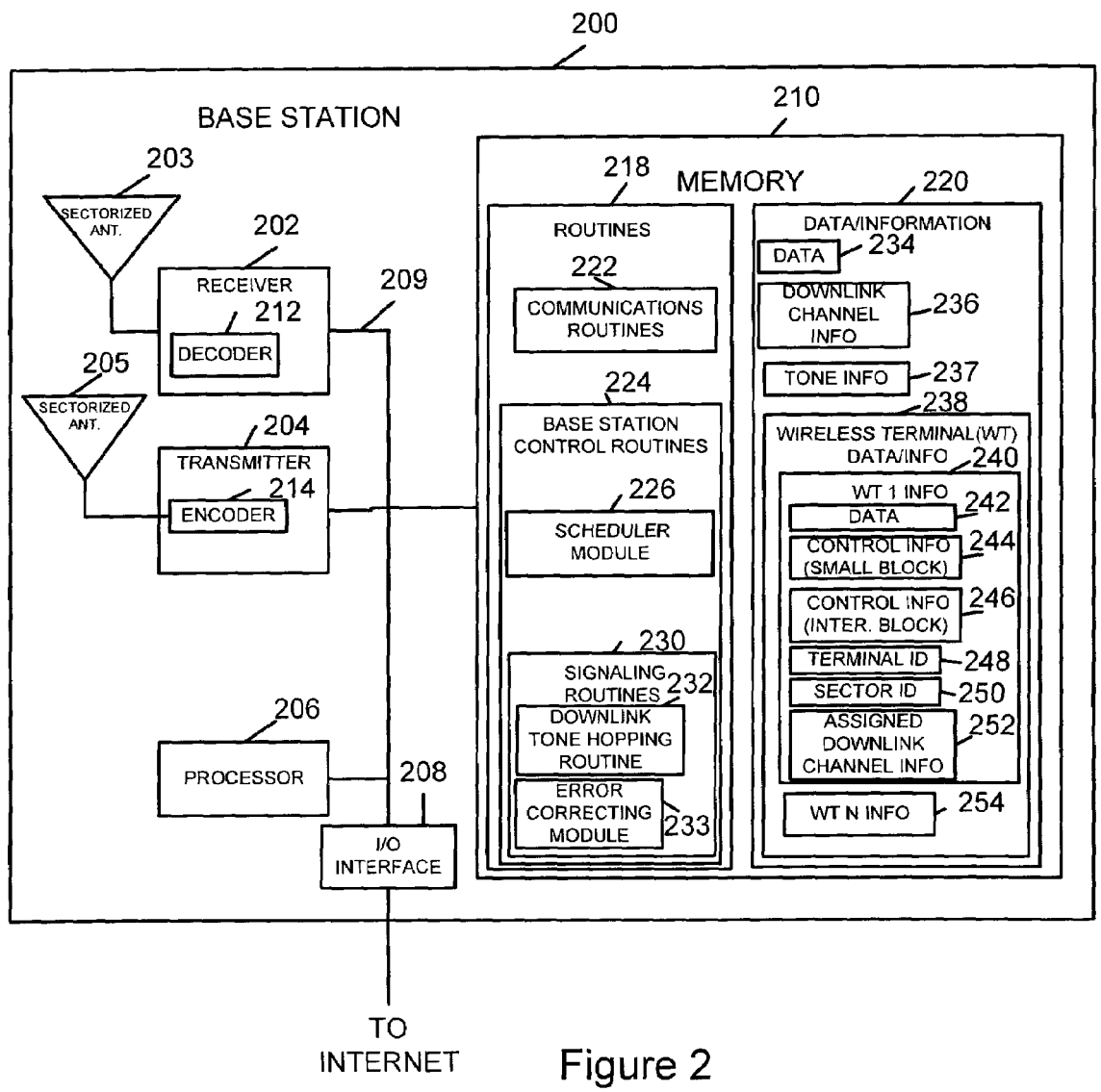
FIG. 2 illustrates an exemplary base station, suitable for use in the system of FIG. 1, implemented in accordance with the present invention.

FIG. 2 illustrates an exemplary base station 200 implemented in accordance with the present invention. Exemplary base station 200 implements the downlink resource allocation method of the present invention. The base station 200 may be used as any one of the base stations 106 of the system 100 of FIG. 1. The base station 200 includes a receiver 202 including a decoder 212, a transmitter 204 including an encoder 214, a processor, e.g., CPU 206, an input/output interface 208, and a memory 210 which are coupled together by a bus 209 over which the various elements 202, 204, 206, 208, and 210 may interchange data and information.

Sectorized antenna 203 coupled to receiver 202 is used for receiving data and other signals, e.g., channel reports, from wireless terminals' transmissions from each sector within the cell in which the base station 200 is located. Sectorized antenna 205 coupled to transmitter 204 is used for transmitting data and other signals, e.g., wireless terminal power control command signals, timing control signals, resource allocation information, pilot signals, etc. to wireless terminals 300 (see FIG. 3) within each sector 110, 112, 114 of the base station's cell 102. In various embodiments of the invention, base station 200 may employ multiple receivers 202 and multiple transmitters 204, e.g., an individual receiver 202 for each sector 110, 112, 114 and an individual transmitter 204 for each sector 110, 112, 114. The processor 206, may be, e.g., a general purpose central processing unit (CPU). Memory 210 includes routines 218 and data/information 220. Processor 206 controls operation of the base station 200 under direction of one or more routines 218 stored in memory 210 and using data/information 220 implements the methods of the present invention. I/O interface 208 provides a connection to other network nodes, coupling the BS 200 to other base stations, access routers, AAA server nodes, etc., other networks, and the Internet.

Data/information 220 includes data 234, downlink channel information 236, tone information 237, and wireless terminal (WT) data/info 238 including a plurality of WT information: WT 1 info 240 and WT N info 254. Each set of WT info, e.g., WT 1 info 240 includes data 242, control information for small size data blocks 244, control information for intermediate size data blocks 246, a terminal identifier (ID) 248, a sector identifier (ID) 250, and assigned downlink channel information 252.

Routines 218 include communications routines 222 and base station control routines 224. Base station control routines 224 includes a scheduler module 226 and signaling routines 230 including a downlink tone allocation hopping routine 232, and an error correcting module 233.

Data 234 may include data/information to be processed by encoder 214 and transmitted on downlink channels by transmitter 204 to a plurality of WTs 300 and the received data/information from WTs 300 that has been processed through decoder 212 of receiver 202 following reception. Downlink channel information 236 may include information identifying downlink channels in terms of functional use, e.g., downlink traffic channels, downlink WT power control channels, and other downlink control channels, e.g., downlink timing control channels. Downlink channel information 236 may also include information identifying different types of downlink channels in terms of tone overlap between adjacent sectors, e.g., full overlap channels, no overlap channels, and partial overlap channels. In addition, downlink channel information 236 may include information associating the different types of functional use channels with different types of tone overlap. For example, downlink traffic channels, carrying large size coded transmission blocks of non-time critical data may have complete overlap of tones; WT power control downlink channels carrying a small size transmission blocks using a single or a few bits and carrying time critical data may have no tone overlap between adjacent sectors. Other control channels, e.g., timing control downlink channels carrying medium size coding blocks with some error protection, but more prone to bursty interference than blocks of larger size, may have partial overlap of tones between adjacent sectors. Tone information 237 may include information indicating a carrier frequency assigned to the base station 200, indices for logical tones, the number of tones in the downlink hopping sequence, indices and frequencies of physical tones corresponding to different frequency subcarriers for use in the downlink hopping sequence, duration of a super slot, e.g., the repeat interval for a downlink tone hopping sequence, and cell specific values such as slope which is used to identify the particular cell. WT1 Data 242 may include data that base station 200 has received from a peer node intended for WT1 300, data that the BS 200 shall send to WT1 300 on a downlink traffic channel, after error correction processing, e.g., data categorized as corresponding to a large coding block size, e.g., 100's or 1000's of bits in accordance with the invention, and data that WT 1 300 desires to be transmitted to a peer node. Small block size control information 244 may include data blocks of small size, e.g., 1 bit or a few bits, such as, e.g., WT1 300 power control command information that BS 200 conveys on a WT power control downlink channel. Small block size control information 244 is usually data or control information that is time critical, and/or where the data unit to be transmitted can be represented by one or a few bits. Small block control information 244 to be transmitted may have no ECC processing prior to transmission, e.g., in the case where the information is formed into a single bit transmission block size, where there are no bits left over for error correction purposes. In other cases, small block size control information 244 may be processed using small sized error correction coding, e.g., repetition coding, generating additional ECC bits, prior to transmission. Intermediate block size control information 246 includes control information, e.g., timing control information. Intermediate size coded blocks include more than a few bits, e.g., 10's or 100's of bits. Information in intermediate size blocks may be somewhat time critical. Intermediate size blocks of information are typically subjected to some ECC processing while being formed into a coded intermediate size transmission block, which normally includes at least some ECC bits. Terminal ID 248 is an ID that is assigned by base station 200 which identifies WT 1 300 to the BS 200. Sector ID 250 includes information identifying the sector, 110, 112, 114 in which WT1 300 is operating. Assigned downlink channel information 252 includes information identifying channel segments that have been allocated by scheduler 226 to carry data and information to WT1 300, e.g., downlink traffic channel segments with full tone overlap for data, WT power control command channel segments with no tone overlap between adjacent sectors, and other control channel segments, e.g., timing control channel segments with partial tone overlap between adjacent sectors. Each downlink channel assigned to WT1 300 may include one or more logical tones, each following a downlink hopping sequence.

Communications routines 222 control the base station 200 to perform various communications operations and implement various communications protocols.

Base station control routines 224 are used to control the base station 200 to perform basic base station functional tasks, e.g., signal generation and reception including the tone hopping and error correcting coding processing, scheduling of channels segments to WTs 300, and to implement of the steps of the method of the present invention to communicate different size blocks of information from the base station to WTs 300 in a sectorized environment in accordance with the present invention.

Scheduler module 226 allocates downlink and uplink channel segments to the WTs 300 within each sector 110, 112, 114 of its cell 102. Each channel segment includes one or more logical tones for a determined duration of time. Downlink channels segments, such as, e.g., downlink traffic channel segments carrying large transmission blocks of data, WT power control channel segments carrying small transmission blocks, and other control channel segments, e.g., timing control channels segments, carrying intermediate size transmission blocks are allocated to WTs 300 by the scheduler 226.

Signaling routines 230 control the operation of receiver 202 which includes decoder 212 and transmitter 204 which includes encoder 214. The signaling routines 230 are responsible for controlling the generation and detection of various size transmission blocks including data, control information, and ECC bits. Downlink tone hopping routine 232 determines, e.g., downlink tone hopping sequences using information including tone information 237, and downlink channel information 236. The downlink tone hopping sequences are synchronized across the sectors 110, 112, 114 of the cell 102, such that at any given time, in each sector of the cell 102, the total number of available tones, e.g., an overall, e.g., total, tone set encompassing the frequency spectrum, is divided into non-overlapping tone sets, each channel in each sector is assigned to use one of the non-overlapping tone sets. Corresponding channels in the various sectors of the cell 102 use the same tone set at any given time in one embodiment with signals being transmitted in a synchronized manner in the various sectors. Error correcting module 233 controls the operation of the receiver 202 and its decoder 212 to remove the encoding on the data and information transmitted from WTs 300. Error correcting module 233 also controls the operation of the transmitter 204 and its encoder 214 to encode data and information to be transmitted from BS 200 to WTs 300. In accordance with the invention the ECC module 233 may apply EEC processes to blocks of information creating transmission blocks including ECC bits.

Figure 3:
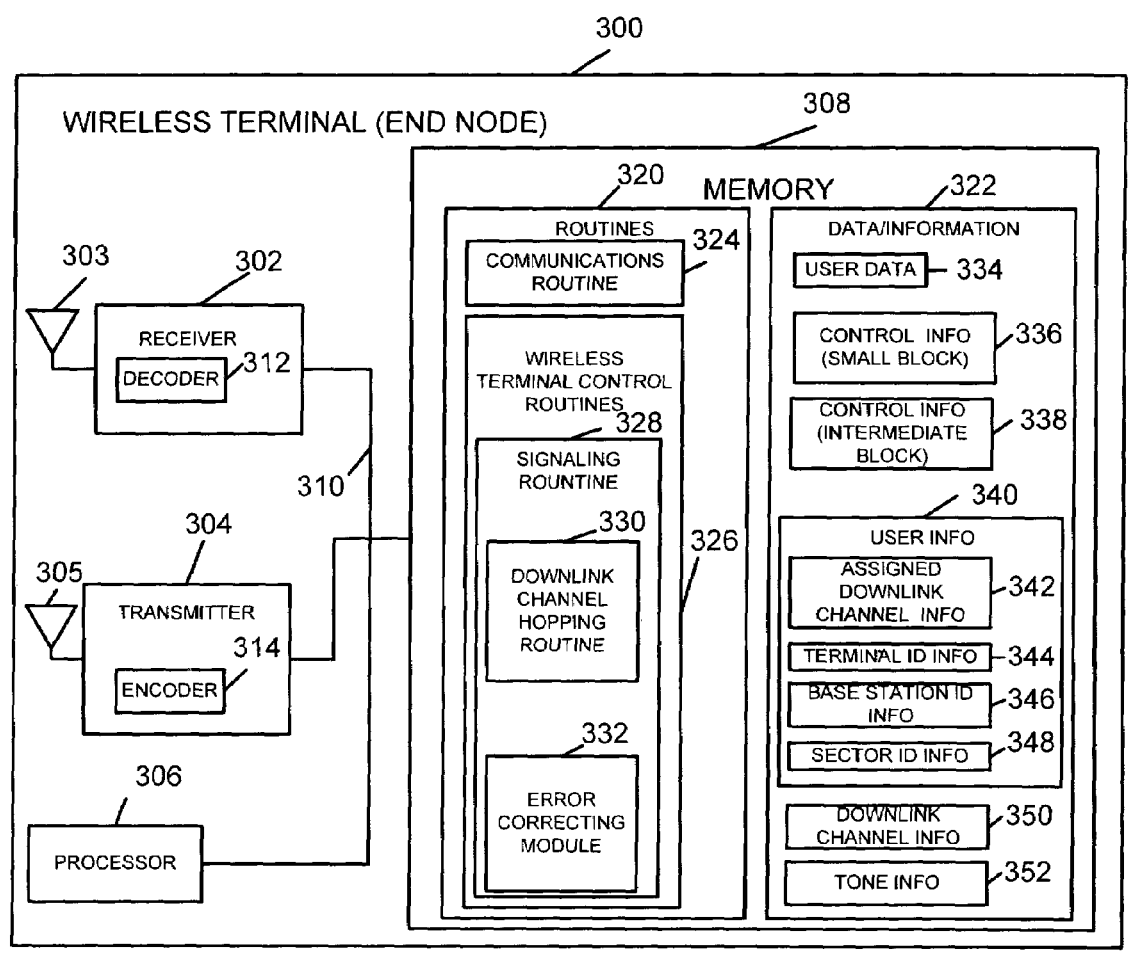
FIG. 3 illustrates an exemplary wireless terminal, suitable for use in the system of FIG. 1, implemented in accordance with the present invention.

FIG. 3 illustrates an exemplary wireless terminal (end node) 300 which can be used as any one of the wireless terminals (end nodes), e.g. EN(1) 136, of the system 100 shown in FIG. 1. Wireless terminal 300 is implemented in accordance with the downlink resource allocation methods of the present invention. The wireless terminal 300 includes a receiver 302 including a decoder 312, a transmitter 304 including an encoder 314, a processor 306, and memory 308 which are coupled together by a bus 310 over which the various elements 302, 304, 306, 308 can interchange data and information. An antenna 303 used for receiving signals from a base station 200 is coupled to receiver 302. An antenna 305 used for transmitting signals, e.g., to base station 200 is coupled to transmitter 304.

The processor 306 controls the operation of the wireless terminal 300 by executing routines 320 and using data/information 322 in memory 308.

Data/information 322 includes user data 334, small block control information 336, intermediate block control information 338, user info 340, downlink channel information 350, and tone information 352. User data 334 may include text, voice, and/or information files. User data 334 may include large size data blocks of data, e.g. 100's or 1000's of bits, processed by decoder 312 from a large size transmission block, which had been transmitted by BS 200. Such information may be of a type requiring a large number of bits to be useful and/or tend to be less time critical than control signals. Typically, downlink user data is conveyed from BS 200 to WT 300 over a downlink communication channel that has full overlap between tones on which signals are transmitted in adjacent sectors. User data 334 may also include data intended for a peer node, e.g., another WT, that shall be transmitted to base station 200 via an uplink traffic channel, following processing by encoder 314. Small block control information 336 may include data such as WT power control command information that has been transmitted from BS 200 via a downlink control channel. Small size block control information 336 is typically time critical and takes very few bits to communicate. In the case of the small size blocks of information 336 where the coded block size is one bit, there are no bits left over for ECC purposes, and the information is conveyed without the benefit of ECC coding making the small block information 336, in such as case, particularly prone to loss due to interference. In other cases, small block control information 336 may be processed by small sized error correction coding, e.g., repetition coding, into a small block size coded block including a few ECC bits. In the case where a small coded block includes a few ECC bits, it still tends to be subject to loss due to impulse or other noise since data sequencing is limited to a very small number of bits or not used at all, making small blocks susceptible to impulse or other short term noise bursts. Small blocks of information 336 are conveyed from BS 200 to WT 300 over a downlink control channel with no tone overlap between adjacent sectors in terms of tones used to transmit small blocks on a channel at a particular point in time. Thus, intersector interference is generally avoided in the case of transmissions of blocks having a small coding size. Intermediate block size control information 338 may include control information that is somewhat time sensitive, but less time critical than small block information 336 and may be represented by a coding block of intermediate size, e.g. 10's or 100 bits. Intermediate block size control information 338 may be, e.g., timing control information. Such information may be conveyed from BS 200 to WT 300 using a downlink control channel where some but not all tones used in adjacent sectors to transmit the intermediate sized block during a transmission period overlap. The intermediate size transmission block used to transmit information 338 may typically include some ECC bits. User information 340 includes assigned downlink channel information 342, terminal ID information 344, base station ID information 346, and sector ID information 348. Assigned downlink channel information 342 includes information identifying channel segments that have been allocated by scheduler 226 to carry data and information to WT 300, e.g., downlink traffic channel segments with full transmission tone overlap between adjacent sectors for data, WT power control command channel segments with no transmission tone overlap between adjacent sectors, and other control channel segments, e.g., timing control channel segments with partial transmission tone overlap between adjacent sectors. Each downlink channel assigned to WT 300 may include one or more logical tones, each following a downlink hopping sequence, which is synchronized between each sector of the cell.

User info 340 further includes terminal ID information 344 which may be, e.g., a base station 200 assigned identification information, base station ID information 344 which identifies the specific base station 200 that WT 300 has established communications with may provide a cell slope value used in generating the downlink hopping sequence, and sector ID info 348 which identifies the specific sector of the cell where WT 300 is presently located.

Downlink channel information 350 may include information identifying downlink channels in terms or functional use, e.g., downlink traffic channels, downlink WT power control channels, and other downlink control channels, e.g., downlink timing control channels. Downlink channel information 350 may also include information identifying different types of downlink channels in terms of transmission tone overlap between adjacent sectors, e.g., full transmission tone overlap channels, no transmission tone overlap channels, and partial transmission tone overlap channels. In addition, downlink channel information 350 may include information associating the different types of functional use channels with different types of transmission tone overlap. For example, downlink traffic channels, carrying large size transmission blocks may have complete overlap in terms of tones used to actually transmit tones referred to as transmission tones; WT power control downlink channels with a small size transmission blocks may have no transmission tone overlap between adjacent sectors, and other control channels, e.g., timing control downlink channels, may have partial transmission tone overlap of between adjacent sectors.

Tone information 352 may include a carrier frequency assigned to each of the base stations 200, indices for logical tones, the number of tones in the downlink hopping sequence, indices and frequencies of physical tones in the downlink hopping sequence, duration of a super slot, e.g., the repeat interval for a downlink tone hopping sequence, and cell specific values such as slope for each base station 200.

Routines 320 include communications routines 324 and wireless terminal control routines 326. Communications routines 324 control the various communications protocols used by WT 300. Wireless terminal control routines 326 controls basic wireless terminal 300 functionality including: the control of the receiver 302 and transmitter 304, power control, timing control and synchronization, and user input/output options and requests. Wireless terminal control routines 326 also include signaling routines 328 which control the signal generation, reception and processing. Signaling routines 328 include a downlink channel hopping routine 330 and an error correcting module 332. Downlink channel hopping routine 330 uses user data/info 322 including downlink channel information 350, base station ID info 346, e.g., slope, tone information 352 in order to generate the downlink tone hopping sequences and process received data transmitted from base station 200. Under the direction of the error correcting module 332, the decoder 312 of receiver 302 processes transmission blocks to perform ECC and obtain the information and data sent by BS 200. ECC module 332 also controls the encoder 314 of transmitter 304 to encode data and information prior to transmission to the base station 200.

Figure 4:
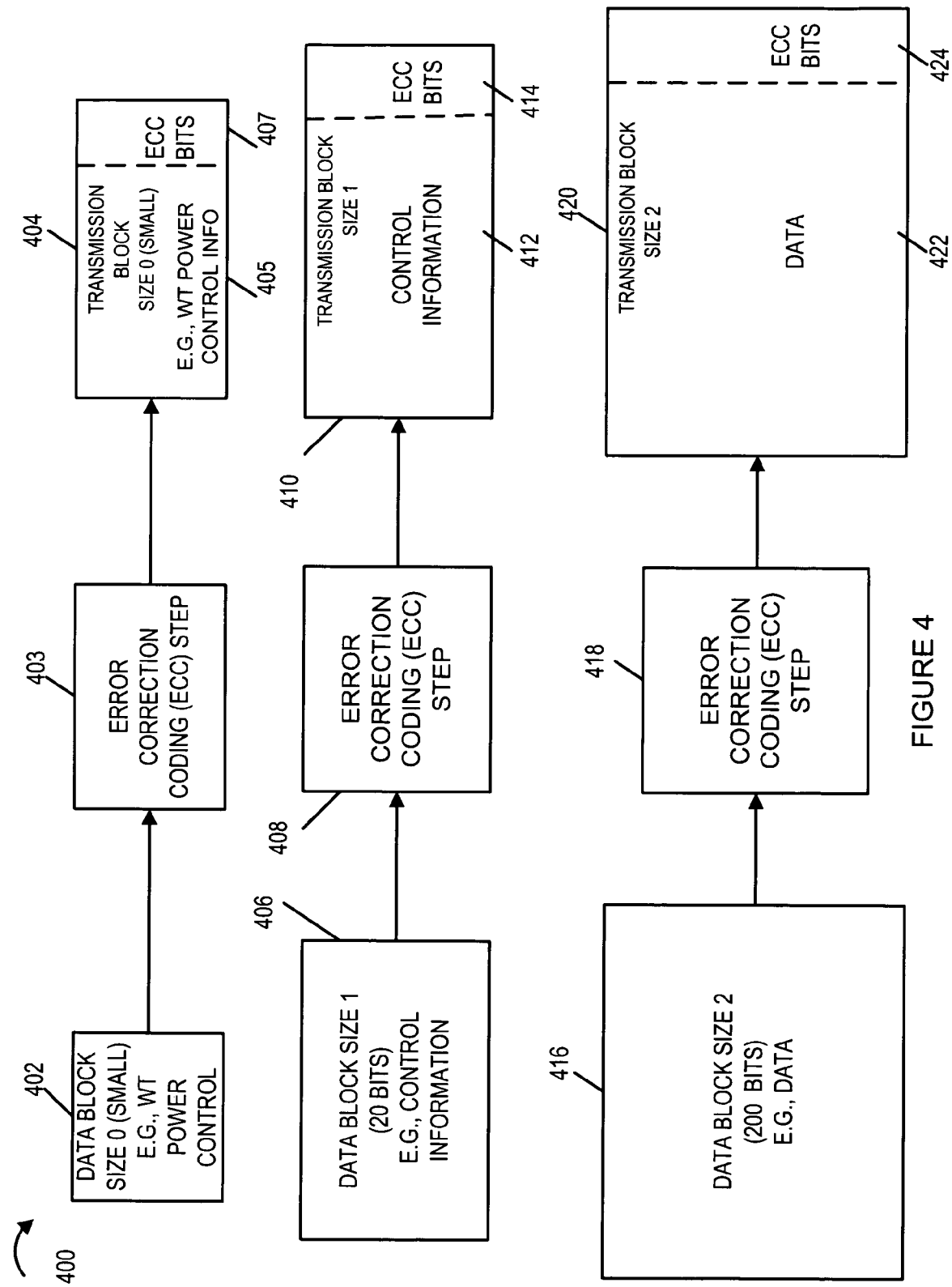
FIG. 4 illustrates data blocks of various sizes, error correcting processes, and transmission blocks of various sizes, used for explaining the present invention.

FIG. 4 illustrates exemplary different size blocks of information, error correcting processes, and transmission blocks of various sizes in accordance the present invention. While the coding is described as error correction coding, it should be appreciated that error dection bits may, and in various embodiments are, coded in addition to, or instead of, error correction bits. In many cases, error correction bits can also be used as error detection bits. Thus, it should be appreciated that error detection and/or error correction bits may be generated and included in coded blocks to be transmitted as part of the error correction processing shown in FIG. 4. The drawing 400 of FIG. 4, shows three different size blocks of information that a base station 200 may desire to convey to a wireless terminal 300 in a wireless sectorized communications cell, e.g., sector 1 112 of cell 102 of FIG. 1. Other embodiments of the invention may have categories for more than three different size blocks of information with differing amounts of transmission tone overlap being used for the different sized blocks with the amount of transmission tone overlap increasing with increasing coding block size. FIG. 4 includes an exemplary first size block of information 402, which is a data block of size 0 (small), and may include, e.g., Wireless Terminal (WT) power control command information. First size (small) block of information 402 is time critical in this example, and thus is not grouped with other control information into a larger block. In some embodiments, first size (small) blocks of information 402 are less than 10 bits in length and are used to communicate control information. The coded block 404 in the case of a first size block may be the same as the uncoded block or include small sized error correction coding bits 407. In one embodiment, for a single bit data block 402, one or more repetition bits are generated and included in the coded block 404. In such a case, the coded block 404 would include at least one ECC bit 407 in addition to the control information bit 405. In the FIG. 4 example, ECC bits 407 are generated in step 403, using a method which produces relatively few ECC or error detection bits resulting in small sized error correction codes. Examples of suitable methods include repetition coding and parity coding. FIG. 4 also includes an exemplary second size block of information 406, which has an exemplary uncoded data block size 1 (20 bits), and may include, e.g. control information such as timing control information. Error correction coding and/or interleaving (re-sequencing) may be performed on the second block to help protect against burst errors. The resulting coded block 410 of the second size includes the same number of bits or more bits than the unencoded block 406. In the FIG. 4 example, error correction code bits 414 are generated in step 408 from the bits in block 406 and are then added to the information bits 412 to generate the second size block of coded information to be transmitted. In some embodiments, different ones of the ECC bits 414 and/or information bits 412 are transmitted using different tones to further protect against the possibility of errors due to noise which may be encountered at the frequency of one of the utilized tones.

FIG. 4 also includes an exemplary third size block of information 416, which is a data block of size 2 (200 of Bits), and may include, e.g., user data. Third size (large) blocks of information 416 may include information and/or control signals which are not particularly time critical and allowing them to be grouped together to form a larger block of data which may be coded and transmitted as a unit, e.g., a large coded block. Unencoded data block 416 of the third size is subject to error correction coding and/or interleaving in step 418 to produce a large coded block 420 to be transmitted. As part of the ECC processing 418 error correction bits 424 are generated and added to the data bits 422 thereby forming large coded blocks 420. ECC bits 407, 414 and 424 are shown located at the end of transmission blocks 404, 410 and 420 but may be interleaved with the data bits.

Generally, where some form of signal coding is used, the larger the block size used in coding the greater the protection against burst errors where one or a few consecutive bits are lost, e.g., at one or more different locations in the coded block. Burst errors are common in the case of wireless systems and may be the result of unpredictable impulse noise occurring on one or more tones. Error correction in normally supported in both the intermediate and large transmission blocks (410,420), and may be supported in the small transmission blocks 404 as well. The small size (coding) transmission block 404 may be more prone to errors due to bursty signal interference and/or other types of interference than intermediate size (coding) transmission block 410, since the small sized block error codes, e.g., repetition codes, are less effective at reducing the effect of bursty signal interference than the coding techniques generally used for intermediate sized (coding) transmission blocks 410. The intermediate size (coding) transmission block 410 may be more prone to errors due to bursty signal interference and/or other interference than blocks of larger size 420 where error correction coding and the data resequencing over the larger block size 420 can provide better protection against interference than may be possible in a medium sized coding block 410. In large coded blocks 420, a relatively larger number of bits may be allocated to be used for ECC purposes providing a higher degree of protection than in the case of smaller blocks, e.g., intermediate sized coded blocks 410, where proportionally fewer ECC bits relatively to the blocks number of data bits.

The different coded blocks 404, 410, 420 of first, second, and third sizes are transmitted by transmitter 204 through sectorized antenna 205 to WT 300, each block being transmitted on a communications channel using tones allocated in accordance with the present invention.

In some embodiments of the invention, first size information blocks, e.g., data block size 0 (small) 402, are smaller than second size information blocks, e.g., data block size 1 (intermediate) 406, and second size information blocks, e.g., data block size 1 (intermediate) 406 are smaller than third size information blocks, e.g., data block size 2 (large) 416. First, second, and third size information blocks and transmission blocks may exist for each sector 112, 114, 116 of the cell 102, and the transmission blocks may be transmitted simultaneously in each sector in accordance with the present invention or at different times.

In some embodiments the categorizing of information and data into different size information and transmission blocks may predetermined by e.g., information type, such as user data, power control information, etc., and the classifications may be stored in both the BS 200 and the WTs 300, for use in implementing the present invention.

FIG. 5 via drawing 500 shows exemplary tone allocations to various downlink channels in two adjacent sectors, sector A and B of an exemplary OFDM wireless system, e.g., a two sector system, to illustrate the present invention. The air link resource available for downlink communications from the base station 200 to WT 300 may be represented by frequency spectrum 502 which corresponds to the total tone set which includes tones 0 through 9. In each sector A and B, the same frequency spectrum 502 may be subdivided into OFDM tones, e.g., 10 exemplary OFDM tones: tone 0 564, tone 1 566, tone 2 568, tone 3 570, tone 4 572, tone 5 574, tone 6 576, tone 7 578, tone 8 580, and tone 9 582. In sector A, the 10 OFDM tones are further represented by: tone $0_A$ 504, tone $1_A$ 506, tone $2_A$ 508, tone $3_A$ 510, tone $4_A$ 512, tone $5_A$ 514, tone $6_A$ 516, tone $7_A$ 518, tone $8_A$ 520 and tone $9_A$ 522. In sector B, the 10 OFDM tones are further represented by : tone $0_B$ 534, tone $1_B$ 536, tone $2_B$ 538, tone $3_B$ 540, tone $4_B$ 542, tone $5_B$ 544, tone $6_B$ 546, tone $7_B$ 548, tone $8_B$ 550 and tone $9_B$ 552. Exemplary tone allocation and utilization methods of the present invention generally indicated by reference number 500 will now be discussed with reference to FIG. 5. As illustrated in FIG. 5, the total frequency spectrum 502 is divided into ten tones, tone 0 through tone 9 as shown in column 509 for the illustrated symbol transmission time period. In accordance with the present invention, the tones are divided to support at least three types of channels, a first channel used to transmit large coded blocks of information, e.g., a traffic channel, a second channel used to transmit small coded blocks, e.g., a first control channel, and a third channel used to transmit intermediate size coded blocks, e.g., a second control channel. In FIG. 5, in columns 501 and 505 shading is used to indicate tones which are allocated to be used for the transmission of signals corresponding to a coded block. Unshaded tones in column 501 and 505 are controlled to go unused.

For purposes of explaining the invention, it is assumed that the same set of tones is designated in each sector of the cell as corresponding to the same channel. However, in the case of small and intermediate size coded blocks, what is important is the relationship in terms of tones assigned for the transmission of data in a sector to tones which are controlled to go unused during a particular transmission period in one or more adjacent sectors to avoid or reduce inter-sector interference. As can be appreciated, the allocation of unused tones to a particular channel is not important since the tone will not be used to carry information and is therefore the same as any other unused tone. What is important in non-overlapping instances is that a tone in the first sector that is assigned to be used as a transmission tone will go unused in the adjacent sector. Conceptually, however, it may be useful to think of the unused tones as corresponding to particular channels. In addition, in FIG. 5, the tones of a given channel are shown to be contiguous, for the sake of simplicity. However, in reality, the tones may be non-contiguous.

FIGS. 5 and 6 show various tone allocations for two adjacent sectors A and B, during first and second symbol transmission times, respectively. The transmission symbol time of FIG. 6 occurs immediately following the symbol time of FIG. 5 in some implementations. The two different symbol times are shown to illustrate that tones allocated to particular channels may be varied with time, e.g., hopped.

In the FIG. 5 illustration, columns 501, 503 correspond to sector A tone allocations, while columns 505, 507 correspond to sector B tone allocations. Shading is used in columns 501, 505 to illustrate tones which are allocated for use in transmitting information. These transmit tones may or may not actually be used to transmit data depending on system loading. In a fully utilized system information will be transmitted on these tones. Accordingly, for purposes of explaining the invention it will be assumed that data is transmitted on the shaded tones of columns 501 and 505. Transmission on unshaded tones in columns 501, 505 is prevented by the transmission control mechanism implemented in a cell in accordance with the present invention. These tones will go unused in the exemplary symbol time period shown in FIG. 5.

Column 503 illustrates the relationship between tones listed in column 501 and the various communications channels in sector A. Similarly column 507 illustrates the relationship between tones listed in column 505 and the various communications channels in sector B. Note that the same communications channels are supported in sector A and B but that there is a significant difference in the overlap in terms of transmission tones depending on the size of the coded block being transmitted.

With regard to larger coded blocks, in FIG. 5, in sector A, tones 0, 1, 2 (504, 506, 508) are allocated to traffic channel A, as shown by block 524, for use as transmission tones in transmitting information corresponding to large coded data blocks, e.g., traffic blocks. In sector B the same set of tones 0, 1, 2 (534, 536, 538) are allocated to traffic channel B, as shown by block 554, for use as transmission tones in transmitting information corresponding to large coded data blocks, e.g., additional traffic blocks. In the case of the transmission of large coded blocks, there is full overlap in terms of tones allocated for transmission of information as shown by the cross hatching of tones 0, 1, 2 (564, 566, 568) shown in column 509.

In the case of small blocks of coded information, e.g., transmitted on the first control channel, tones used to transmit information in one sector go unused in the neighboring sector. In column 501, it can be seen in the example that tones 3 and 4 (510, 512) are allocated for use as transmission tones in sector A and that they correspond to control channel 1 as shown by block 526 in column 503. These tones go unused in sector B during the illustrated symbol transmission time with tones 5 and 6 (544, 546) being allocated for use as transmission tones in sector B. In sector B, tones 5 and 6 correspond to control channel 1 as indicated by block 556. Note that transmission is controlled in sector A so that tones 5 and 6 (514, 516) go unused in sector A while they are allocated for the transmission of small coded blocks in sector B. Unused tones 5 and 6 in sector A and unused tones 3 and 4 in sector B may be interpreted as corresponding to control channel 1 even though they are not used for the transmission of information during the illustrated symbol time. In the case of control channel 1, which is used to transmit small coded blocks, there is no overlap in terms of transmission tones, i.e., tones allocated for the purpose of transmission of information signals on the tones are different in each sector and go unused in the adjacent sector. Tones 3, 4, 5, 6 ( 570, 572, 574, 576) are left unshaded in column 509 since there is no overlap in terms of transmission tones in sectors A and B in the case of these tones which correspond to the first control channel.

In the case of intermediate size blocks of coded information, e.g., transmitted on the second control channel, some but not all tones used to transmit information in one sector go unused in the neighboring sector. In column 501, it can be seen in the example that tones 7 and 8 are allocated for use as transmission tones in the first sector and that they correspond to control channel 2 as shown by block 528 in column 503. Of these tones, tone 7 (548) goes unused in sector B during the illustrated symbol transmission time with tones 8 and 9 (550, 552) being allocated for use as transmission tones in sector B. In sector B, transmission tones 8 and 9 (550, 552) correspond to control channel 2 as indicated by block 558. Note that transmission is controlled in sector A so that tone 9 (522) goes unused in sector A while it is allocated for the transmission of intermediate size coded blocks in sector B. Unused tone 9 (522) in sector A and unused tone 7 in sector B may be interpreted as corresponding to control channel 2 even though they are not used for the transmission of information during the illustrated symbol time. In the case of control channel 2, which is used to transmit intermediate size coded blocks, there is partial overlap in terms of transmission tones, i.e., some tones allocated for the purpose of actual transmission of information signals are used in both sectors while other tones are not used in both sectors. Tones 7 and 9 (578, 582) are left unshaded in column 509 since there is no overlap in terms of transmission tones in sectors A and B in the case of these tones while tone 8 (580) is shown cross-hatched since it is used in both sectors A and B for transmission purposes resulting in a full signal overlap in the case of tone 8 (580).

In the FIG. 6 illustration, columns 601, 603 correspond to sector A tone allocations, while columns 605, 607 correspond to sector B tone allocations. Shading is used in columns 601, 605 to illustrate tones which are allocated for use in transmitting information. These transmit tones may or may not be actually used to transmit data depending on system loading. In a fully utilized system information will be transmitted on these tones. Accordingly, for purposes of explaining the invention it will be assumed that data is transmitted on the shaded tones of columns 601 and 605. Transmission on unshaded tones in columns 601, 605 is prevented by the transmission control mechanism implemented in a cell in accordance with the present invention. These tones will go unused in the exemplary symbol transmission time period shown in FIG. 6.

Column 603 illustrates the relationship between tones listed in column 601 and the various communications channels in sector A. Similarly column 607 illustrates the relationship between tones listed in column 605 and the various communications channels in sector B. Note that the same communications channels are supported in sector A and B but that there is significant difference in the overlap in terms of transmission tones depending on the size of the coded block being transmitted.

With regard to larger coded blocks, in FIG. 6, in sector A, tones 2, 3, 4 (608, 610, 612) are allocated to traffic channel A, as shown by block 624, for use as transmission tones in transmitting information corresponding to large coded data blocks, e.g., traffic blocks. In sector B the same set of tones 2, 3, 4 (638, 640, 642) are allocated to traffic channel A, as shown by block 654, for use as transmission tones in transmitting information corresponding to large coded data blocks, e.g., traffic blocks. In the case of the transmission of large coded blocks, there is full overlap in terms of tones allocated for transmission of information as shown by the cross hatching of tones 2, 3, 4 (668, 670, 672) shown in column 609.

In the case of small blocks of coded information, e.g., transmitted on the first control channel, tones used to transmit information in one sector go unused in the neighboring sector. In column 601, it can be seen in the example that tones 5 and 6 (614, 616) are allocated for use as transmission tones in sector A and that they correspond to control channel 1 as shown by block 626 in column 603. These tones go unused in sector B during the illustrated symbol transmission time with tones 7 and 8 (648, 650) being allocated for use as transmission tones in sector B. In sector B, tones 7 and 8 (648, 650) correspond to control channel 1 as indicated by block 656. Note that transmission is controlled in sector A so that tones 7 and 8 (618, 620) go unused in sector A while they are allocated for the transmission of small coded blocks in sector B. Unused tones 7 and 8 (618, 620) in sector A and unused tones 5 and 6 (644, 646) in sector B may be interpreted as corresponding to control channel 1 even though they are not used for the transmission of information during the illustrated symbol time. In the case of control channel 1, which is used to transmit small coded blocks, there is no overlap in terms of transmission tones, i.e., tones allocated for the purpose of actual transmission of information signals on the tones as opposed to being controlled to go unused. Tones 5, 6, 7, 8 ( 674, 676, 678, 780) are left unshaded in column 609 since there is no overlap in terms of transmission tones in sectors A and B in the case of these tones which correspond to the first control channel.

In the case of intermediate size blocks of coded information, e.g., transmitted on the second control channel, some but not all tones used to transmit information in one sector go unused in the neighboring sector. In column 601, it can be seen in the example that tones 0 and 9 (604, 622) are allocated for use as transmission tones in sector A and that they correspond to control channel 2 as shown by block 628 in column 603. Of these tones, tone 9 (652) goes unused in sector B during the illustrated symbol transmission time with tones 0 and 1 (634, 636) being allocated for use as transmission tones in sector B. In sector B, transmission tones 0 and 1 (634, 636) correspond to control channel 2 as indicated by block 658. Note that transmission is controlled in sector A so that tone 1 (606) goes unused in sector A while it is allocated for the transmission of intermediate size coded blocks in sector B. Unused tone 1 (606) in sector A and unused tone 9 (652) in sector B may be interpreted as corresponding to control channel 2 even though they are not used for the transmission of information during the illustrated symbol time. In the case of control channel 2, which is used to transmit intermediate size coded blocks, there is partial overlap in terms of transmission tones, i.e., tones allocated for the purpose of actual transmission of information signals as opposed to tones being controlled to go unused. Tones 1 and 9 (666, 682) are left unshaded in column 609 since there is no overlap in terms of transmission tones in sectors A and B in the case of these tones while tone 0 (664) is shown cross-hatched since it is used in both sectors A and B for transmission purposes resulting in a full signal overlap in the case of tone 0 (664).

Figure 7:
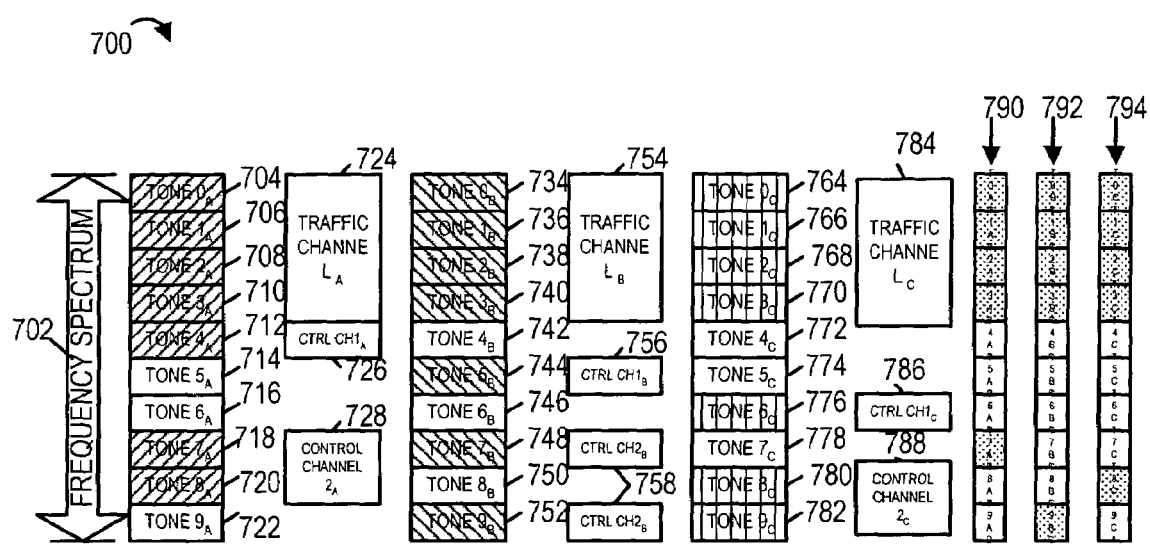
FIG. 7 illustrates examples of tone allocations to different types of channels in a three sector system, in accordance with the present invention.

FIG. 7 via drawing 700 shows exemplary transmission tone allocations to various downlink channels in three sectors, sector A, B and C of an exemplary 3 sector OFDM wireless system, e.g. sector 1 112, sector 2 114, and sector 3 116 of cell 102 of system 100 of FIG. 1, to illustrate the present invention. The air link resource available for downlink communications from the base station 200 to WT 300 may be represented by frequency spectrum 702. In each sector A, B, and C, the same frequency spectrum 702 may be subdivided into the same OFDM tones, e.g., 10 exemplary OFDM tones, identified in sector A as: tone $0_A$ 704, tone $1_A$ 706, tone $2_A$ 708, tone $3_A$ 710, tone $4_A$ 712, tone $5_A$ 714, tone $6_A$ 716, tone $7_A$ 718, tone $8_A$ 720 and tone $9_A$ 722, identified in sector B as: tone $0_B$ 734, tone $1_B$ 736, tone $2_B$ 738, tone $3_B$ 740, tone $4_B$ 742, tone $5_B$ 744, tone $6_B$ 746, tone $7_B$ 748, tone $8_B$ 750 and tone $9_B$ 752, identified in sector C as: tone $0_B$ 764, tone $1_B$ 766, tone $2_B$ 768, tone $3_B$ 770, tone $4_B$ 772, tone $5_B$ 774, tone $6_B$ 776, tone $7_B$ 778, tone $8_B$ 780 and tone $9_B$ 782.

FIG. 7 illustrates fully overlapping traffic channels: sector A traffic channel$_A$ 724, sector B traffic channel$_B$ 754, and sector C traffic channel$_C$ 784. FIG. 7 also shows non-overlapping control 1 channels: sector A control channel $1_A$ 726, sector B control channel $1_B$ 756, and sector C control channel $1_C$ 786. In addition, FIG. 7 shows partially-overlapping control 2 channels: sector A control channel $2_A$ 728, sector B control channel $2_B$ 758, and sector C control channel $2_C$ 788. The traffic channels 724, 754, and 756 use the same four tones (0, 1, 2, 3) for transmissions in each of the three sectors. The control channels 1 726, 756, 786 each use a different one of a subset of three tones (4,5,6) as a transmission tone with the other tones going unused in the individual sector. The control channels 2 728, 758, 788 each use two of the three tones (7, 8, 9) as transmission tones such that between each of two adjacent sectors, one tone will be an overlapping tone and two tones will be non-overlapping tones from the subset of 3 tones (7, 8, 9).

For sector A, ascending diagonal line shading from left to right of boxes 704, 706, 708, 710, 712, 718, and 720 indicates that BS 200 has allocated tones 0, 1, 2, 3, 4, 7, and 8 to be used for signal transmissions to channels in sector A. For sector B, descending diagonal line shading from left to right of boxes 734, 736, 738, 740, 744, 748, and 752 indicates that BS 200 has allocated tones 0, 1, 2, 3, 5, 7, and 9 to be used for signal transmission to channels in sector B. For sector C, vertical line shading of boxes 764, 766, 768, 770, 776, 780, and 782 indicates that BS 200 has allocated tones 0, 1, 2, 3, 6, 8, and 9 to be used for signal transmissions to channels in sector C.

Column 790 represents each of the tones 0 . . . 9, and indicates via shading that tones 0, 1, 2, 3, and 7 represent overlapping transmission tones between sectors A and B. Column 792 represents each of the tones 0 . . . 9, and indicates via shading that tones 0, 1, 2, 3, and 9 represent overlapping transmission tones between sectors B and C. Column 794 represents each of the tones 0 . . . 9, and indicates via shading that tones 0, 1, 2, 3, and 8 represent overlapping transmission tones between sectors C and A.

As can be appreciated, the methods of the invention which involve implementing different transmission channels in adjacent sectors of a cell using 1) non overlapping transmission tones for coded blocks of a first size, 2) partially overlapping transmission tones for coded blocks of a second size which is greater than the first size and 3) fully overlapping transmission tones for coded blocks of a third size which is larger than the second size can be extended to additional channels intended for other size code blocks. For example, coded blocks of a fourth size may be designated as corresponding to a fourth channel which is another overlapping channel. In the case of the fourth channel the coded blocks of the fourth size are larger than the coded blocks of the second size but are smaller than the third size. In one such implementation, the relative ratio of overlapping to non-overlapping tone allocated to the fourth channel, where the non-overlapping tones in each particular sector go unused, is greater than that for the second communications channel. Thus, in such an embodiment, the fourth communications channel provides greater frequency reuse than the second communications channel but less than the third communications channel.

Numerous additional variations on the present invention are possible. For example, multiple channels may be supported for one or more of the at least 3 different coded block sizes supported by the present invention.

The modules used to implement the present invention may be implemented as software, hardware, or as a combination of software and hardware. Among other things, the present invention is directed to machine readable medium, memory, for controlling a device such as a processor to implement one or more steps in accordance with the present invention, e.g., transmission of different size coded data blocks on channels which have differing amounts of frequency reuse.

The methods and apparatus of the present invention may be used with OFDM communications systems as well as with other types of communications systems including CDMA systems.

The invention claimed is:

1. A method of communicating blocks of information in a wireless sectorized frequency division multiplexing communications cell including a base station, a first sector and a second sector, the second sector being located adjacent said first sector, said blocks including blocks of a first size, blocks of a second size, and blocks of a third size, the method comprising:

allocating a first set of tones to a first communications channel in each of the first and second sectors;

allocating a second set of tones to a second communications channel in each of the first and second sectors;

allocating a third set of tones to a third communications channel in each of the first and second sectors;

using the first set of tones in the first sector during a first period of time to communicate information corresponding to blocks of the first size while having the tones in the first set of tones go unused in the second sector while said tones are being used to communicate information in the first sector;

using the second set of tones in the first and second sectors to communicate information corresponding to blocks of the second size during a second period of time, the step of using the second set of tones during the second period of time including:

transmitting information corresponding to blocks of the second size in both the first and second sectors at the same time using the same tones, the same tones being a first subset of tones in said second set of tones;

transmitting information corresponding to blocks of the second size in the first sector using a second subset of tones in said second set of tones while the tones in the second subset which are used to transmit information in the first sector go unused in the second sector; and transmitting information corresponding to blocks of the second size in the second sector using a third subset of tones in said second set of tones while the tones in the third subset which are used to transmit information in the second sector go unused in the first sector; and the third set of tones in the first and second sectors to communicate information corresponding to blocks of the third size during a third period of time, the tones in said third set of tones being used to transmit information in the first and second sectors at the same time.

2. The method of claim 1, wherein the second subset of tones and the third subset of tones have the same number of tones.

3. The method of claim 1, wherein the information corresponding to blocks of the second size in the first sector includes at least one of a set of error correction bits and a set of error detection bits, at least one bit from said at least one set of bits being transmitted using a tone in the first subset of tones and at least another bit from said at least one set of bits being transmitted using a tone in the second subset of tones.

4. The method of claim 1, wherein said first, second and third periods of time are the same.

5. The method of claim 1, wherein the first size being smaller than the second size, and the second size being smaller than the third size.

6. The method of claim 5, wherein blocks of the first size are less than 10 bits in length and are used to communicate control information.

7. The method of claim 6, wherein blocks of the first size are a single bit in length.

8. The method of claim 6, wherein blocks of the third size are more than 20 bits in length.

9. The method of claim 8, wherein blocks of the third size are more than 100 bits in length and wherein each block includes error correction bits which were coded over a majority of the bits in block of the third size to which the error correction bits are included.

10. The method of claim 8, wherein said first, second and third periods of time are the same symbol transmission period of time.

11. The method of claim 8, wherein said first, second and third periods of time are the same symbol transmission period of time.

12. The method of claim 1, wherein said first, second and third periods of time are the same symbol transmission period of time, the method further comprising:
allocating a fourth set of tones to said first communications channel in each of the first and second sectors;
allocating a fifth set of tones to said second communications channel in each of the first and second sectors;
allocating a sixth set of tones to said third communications channel in each of the first and second sectors;
using the fourth set of tones in the first sector during a fourth period of time to communicate information corresponding to blocks of the first size while having the tones in the fourth set of tones go unused in the second sector while said tones are being used to communicate information in the first sector;

using the fifth set of tones in the first and second sectors to communicate information corresponding to blocks of the second size during a fifth period of time, the step of using the fifth set of tones during the fifth period of time including:
transmitting information corresponding to blocks of the second size in both the first and second sectors at the same time using the same tones, the same tones being a first subset of tones in said fifth set of tones;
transmitting information corresponding to blocks of the second size in the first sector using a second subset of tones in said fifth set of tones while the tones in the second subset of tones in said fifth set of tones which are used to transmit information in the first sector go unused in the second sector; and
transmitting information corresponding to blocks of the second size in the second sector using a third subset of tones in said fifth set of tones while the tones in the third subset of tones in said fifth set of tones which are used to transmit information in the second sector go unused in the first sector; and using the sixth set of tones in the first and second sectors to communicate information corresponding to blocks of the third size during a sixth period of time, the tones in said sixth set of tones being used to transmit information in the first and second sectors at the same time.

13. The method of claim 12, wherein at least one tone in said first and fourth sets of tones is different.

14. The method of claim 13, wherein at least one tone in said second and fifth sets of tones is different.

15. The method of claim 14, wherein at least one tone in said third and sixth sets of tones is different and wherein said fourth, fifth and sixth time periods are the same symbol time, said same symbol time following said first time period.

16. The method of claim 15, wherein allocating a first set of tones includes using a tone hopping sequence to determine the tones to be included in said first set of tones.

17. A method of communicating blocks of information in a wireless sectorized frequency division multiplexing communications cell including a base station, a first sector and a second sector, the second sector being located adjacent said first sector, said blocks including blocks of a first size, blocks of a second size, and blocks of a third size, the method comprising:
allocating a first set of tones, to be used to transmit signals in said first sector while going unused in said second sector, to a first communications channel;
allocating a second set of tones, to be used to transmit signals in each of the first and second sectors, to a second communications channel;
allocating a third set of tones, to be used to transmit signals in the first sector while going unused in said second sectors, to said second communications channel;
allocating a fourth set of tones, to be used to transmit tones in said first sector and second sector at the same time, to a third communications channel;
using the first set of tones in the first sector during a first period of time to communicate information corresponding to blocks of the first size while having the tones in the first set of tones go unused in the second sector;
using the second and third sets of tones to communicate information in the first sector corresponding to blocks of the second size, during a second period of time while said second set of tones is used to transmit information corresponding to blocks of the second size in the second sector and said third set of tones goes unused in said second sector; and using the fourth set of tones in the first and second sectors to communicate information corresponding to blocks of the third size at the same time during a third period of time.

18. The method of claim 17, further comprising:

allocating a fifth set of tones, to be used to transmit signals in the second sector while going unused in said first sector, to said second communications channel; and using the fifth set of tones to communicate information in the second sector corresponding to blocks of the second size, during said second period of time while said fifth set of tones goes unused in said first sector.

19. The method of claim 18, wherein the first, second and third periods of time are the same period of time.

20. A base station for controlling transmissions of coded blocks into a first sector and a second sector of a sectorized frequency division multiplexing communications cell, the second sector being located adjacent said first sector, said blocks including blocks of a first size, blocks of a second size, and blocks of a third size, the base station comprising:

tone allocation means for allocating tones for use in each of said first and second sectors, said means for allocating tones allocating a first set of tones to a first communications channel in each of the first and second sectors, allocating a second set of tones to a second communications channel in each of the first and second sectors, and allocating a third set of tones to a third communications channel in each of the first and second sectors; and communications means for:

i) using the first set of tones in the first sector during a first period of time to communicate information corresponding to blocks of the first size while having the tones in the first set of tones go unused in the second sector while said tones are being used to communicate information in the first sector;

ii) using the second set of tones in the first and second sectors to communicate information corresponding to blocks of the second size during a second period of time, the step of using the second set of tones during the second period of time, using the second set of tones including:

transmitting information corresponding to blocks of the second size in both the first and second sectors at the same time using the same tones, the same tones being a first subset of tones in said second set of tones, for transmitting information corresponding to blocks of the second size in the first sector using a second subset of tones in said second set of tones while the tones in the second subset which are used to transmit information in the first sector go unused in the second sector; and transmitting information corresponding to blocks of the second size in the second sector using a third subset of tones in said second set of tones while the tones in the third subset which are used to transmit information in the second sector go unused in the first sector; and iii) using the third set of tones in the first and second sectors to communicate information corresponding to blocks of the third size during a third period of time, the tones in said third set of tones being used to transmit information in the first and second sectors at the same time.

21. The base station of claim 20, wherein said communications means includes:

at least one communications routine for controlling data to be transmitted;

a transmitter for receiving data selected by said at least one communications route to be transmitted; and a sectorized antenna for transmitting blocks of said first, second and third sizes produced by said transmitter.

22. The base station of claim 20, wherein the second subset of tones and the third subset of tones have the same number of tones.

23. The base station of claim 20, wherein the information corresponding to blocks of the second size in the first sector includes at least one of a set of error correction bits and a set of error detection bits, at least one bit from said at least one set of bits being transmitted using a tone in the first subset of tones and at least another bit from said at least one set of bits being transmitted using a tone in the second subset of tones.

24. The base station of claim 20, wherein said first, second and third periods of time are the same.

25. The base station of claim 24, wherein blocks of the first size are less than 10 bits in length and are used to communicate control information.

26. The base station of claim 25, wherein blocks of the third size are more than 20 bits in length.

27. The base station of claim 25, wherein blocks of the third size are more than 100 bits in length and wherein each block includes error correction bits which were coded over a majority of the bits in block of the third size to which the error correction bits are included.

28. The base station of claim 24, wherein blocks of the first size are a single bit in length.

29. The base station of claim 20, wherein the first size is smaller than the second size, and the second size is smaller than the third size.

* * * * *